(12) United States Patent
Todaka

(10) Patent No.: US 11,391,628 B2
(45) Date of Patent: Jul. 19, 2022

(54) OPTICAL RECEIVING CIRCUIT

(71) Applicants: Kabushiki Kaisha Toshiba, Tokyo (JP); Toshiba Electronic Devices & Storage Corporation, Tokyo (JP)

(72) Inventor: Junichi Todaka, Oita (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 8 days.

(21) Appl. No.: 16/994,939

(22) Filed: Aug. 17, 2020

(65) Prior Publication Data

US 2021/0255036 A1    Aug. 19, 2021

(30) Foreign Application Priority Data

Feb. 17, 2020 (JP) .............................. JP2020-024163

(51) Int. Cl.
 *G01J 1/44* (2006.01)
(52) U.S. Cl.
 CPC ........... *G01J 1/44* (2013.01); *G01J 2001/444* (2013.01); *G01J 2001/446* (2013.01)
(58) Field of Classification Search
 CPC ............................................... G01J 2001/444
 See application file for complete search history.

(56) References Cited

U.S. PATENT DOCUMENTS

| | | | |
|---|---|---|---|
| 6,188,059 B1 | 2/2001 | Nishiyama et al. | |
| 7,211,780 B2 | 5/2007 | Nishiyama | |
| 8,138,464 B2 | 3/2012 | Uo | |
| 2014/0111280 A1* | 4/2014 | Schuppener | H03F 3/45475 330/291 |
| 2018/0131342 A1* | 5/2018 | Zamprogno | H03F 3/45475 |
| 2020/0256898 A1* | 8/2020 | Vaiana | H03B 5/04 |

FOREIGN PATENT DOCUMENTS

| | | |
|---|---|---|
| JP | H11-284445 A | 10/1999 |
| JP | 2006-86737 A | 3/2006 |
| JP | 2010-28768 A | 2/2010 |

* cited by examiner

*Primary Examiner* — Thanh Luu
(74) *Attorney, Agent, or Firm* — Allen & Overy LLP

(57) ABSTRACT

According to an embodiment, the optical receiving circuit includes a current compensation circuit, a photodiode, and a transimpedance circuit. The current compensation circuit generates a first current having a positive temperature coefficient. The photodiode receives an optical signal, generates a first current signal including a photoelectric conversion current having a negative temperature coefficient, and outputs a second current signal which is the sum of the first current and the first current signal. The transimpedance circuit has a negative feedback resistor and receives the second current signal and generates an output voltage by current-voltage-converting the second current signal.

11 Claims, 10 Drawing Sheets

OPTICAL RECEIVING CIRCUIT

CROSS REFERENCE TO RELATED APPLICATION

This application is based upon and claims the benefit of priority from the prior Japanese Patent Application No. 2020-024163, filed on Feb. 17, 2020, the entire contents of which are incorporated herein by reference.

FIELD

The embodiments described herein are optical receiving circuits.

BACKGROUND

Optical transmission devices and optical coupling devices employ an optical receiving circuit that receives an optical signal and converts the optical signal to an electrical signal. An optical receiving circuit includes a photodiode that photoelectrically converts an optical signal to generate a current signal and a transimpedance circuit that current-voltage-converts the current signal to generate an output voltage.

The photodiode has a negative temperature coefficient, and thus when the ambient temperature increases, the efficiency of photoelectric conversion decreases, causing a decrease in the current signal. The decrease in the current signal decreases the output voltage of the transimpedance circuit. This causes a problem that an increase in the ambient temperature deteriorates characteristics such as the propagation delay time and the input sensitivity.

Hence, it is desired to compensate for a decrease in the current signal of the photodiode so that the current signal will not decrease to a specified threshold or lower in high temperature operation.

DETAILED DESCRIPTION

Figure 1:
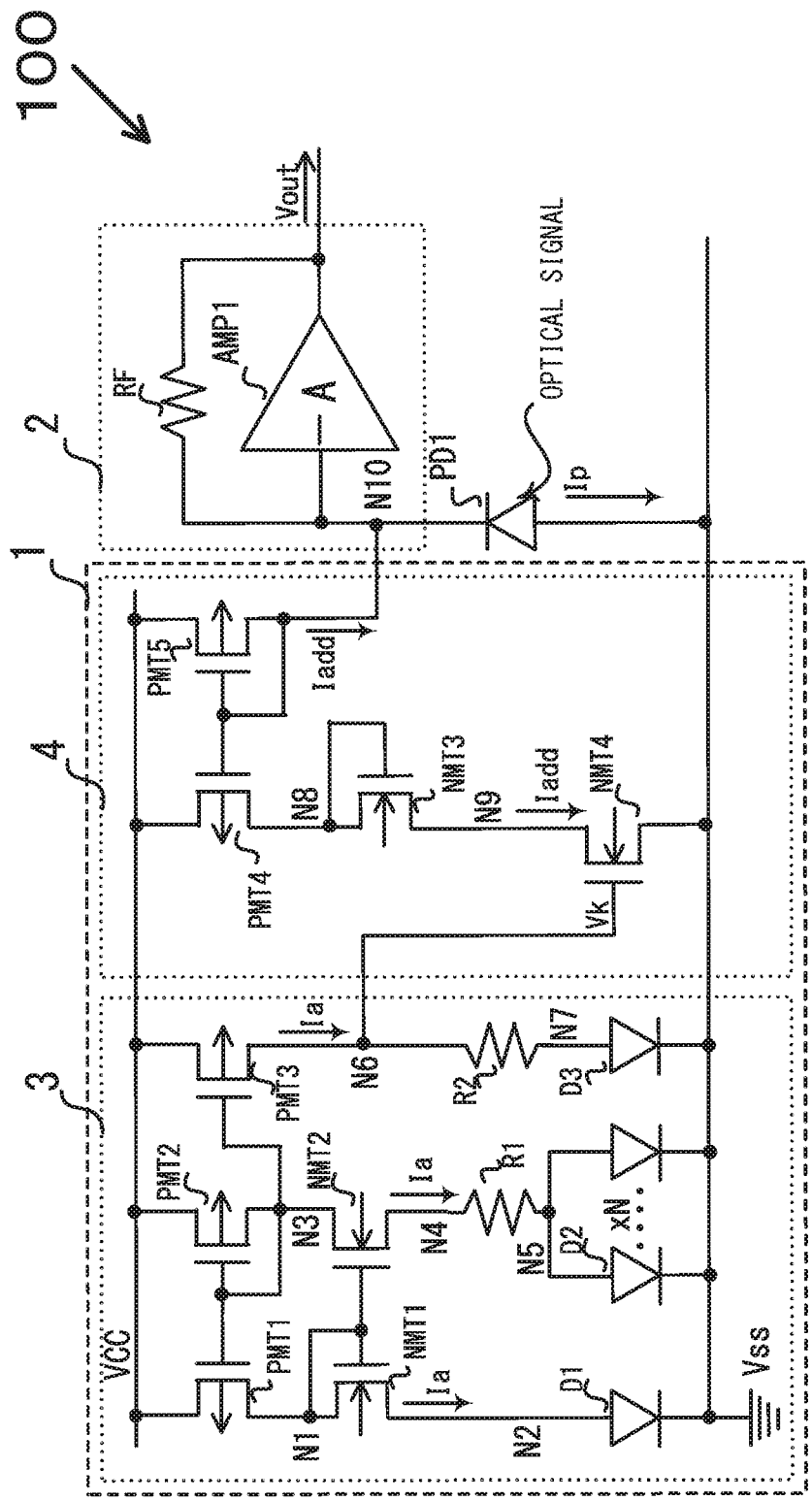
FIG. 1 is a circuit diagram showing an optical receiving circuit according to a first embodiment.

According to an embodiment, the optical receiving circuit includes a current compensation circuit, a photodiode, and a transimpedance circuit. The current compensation circuit generates a first current having a positive temperature coefficient. The photodiode receives an optical signal, generates a first current signal including a photoelectric conversion current having a negative temperature coefficient, and outputs a second current signal which is the sum of the first current and the first current signal. The transimpedance circuit has a negative feedback resistor and receives the second current signal and generates an output voltage by current-voltage-converting the second current signal.

Hereinafter, a plurality of further embodiments will be described with reference to the drawings. In the drawings, the same symbols indicate the same or similar portions.

An optical receiving circuit according to a first embodiment will be described with reference to the drawings. FIG. 1 is a circuit diagram showing the optical receiving circuit.

In the first embodiment, the optical receiving circuit has a current compensation circuit to compensate for a decrease in the current signal caused by a decrease in the photoelectric conversion efficiency of the photodiode that occurs in high temperature operation.

As shown in FIG. 1, the optical receiving circuit 100 includes a current compensation circuit 1, a transimpedance circuit 2, and a photodiode PD1. The optical receiving circuit 100 is one applied to optical communication, but may be applied to medical diagnosis, information processing, camera exposure control, fax, laser alignment, bar codes, and the like.

The current compensation circuit 1 includes a voltage source circuit 3 and a current source circuit 4. The current compensation circuit 1 compensates for a decrease in the current signal caused by a decrease in the photoelectric conversion efficiency of the photodiode in high temperature operation. Details of the compensation will be described later.

The voltage source circuit 3 includes diodes D1 to D3, MOS transistors PMT1 to PMT3, MOS transistors NMT1 and NMT2, resistors R1 and R2. The voltage source circuit 3 causes a current Ia which is a proportional-to-absolute-temperature (PTAT) current to flow through the resistor R2 and outputs a voltage Vk to the current source circuit 4. The voltage source circuit 3 functions as a PTAT power supply circuit in which the output is proportional to absolute temperature. The voltage Vk is a voltage having a positive temperature coefficient (details will be described later).

The MOS transistor PMT1 is a P-channel MOS transistor. MOS transistors are also called MOS field effect transistors (FETs). The MOS transistor PMT1 has a source connected to a power supply (high-potential-side power supply) VCC and a drain connected to a node N1. The power supply (high-potential-side power supply) VCC generates a constant power supply voltage (not illustrated) that is less affected by the ambient temperature.

The MOS transistor NMT1 is an N-channel MOS transistor. The MOS transistor NMT1 has a drain connected to the node N1 and the gate of the MOS transistor NMT1, and a source connected to a node N2.

The MOS transistor PMT2 is a P-channel MOS transistor. The MOS transistor PMT2 has a source connected to the power supply (high-potential-side power supply) VCC, a gate connected to the gate of the MOS transistor PMT1, and a drain connected to the gate of the MOS transistor PMT2 and a node N3.

The MOS transistor NMT2 is an N-channel MOS transistor. The MOS transistor NMT2 has a drain connected to the node N3, a gate connected to the gate of the MOS transistor NMT1, and a source connected to a node N4.

The MOS transistors PMT1 and PMT2 and the MOS transistors NMT1 and NMT2 constitute a Wilson current mirror circuit (also called an improved Wilson current mirror circuit). A Wilson current mirror circuit is capable of generating a stable current that is less affected by fluctuations of a power supply voltage, variations in transistor dimensions, or the like than simple current mirror circuits constituted of two MOS transistors.

The diode D1 has an anode connected to the node N2 and a cathode connected to a ground potential (low-potential-side power supply) Vss.

The resistor R1 has one end connected to the node N4 and the other end connected to a node N5. N diodes D2 are disposed in between the node N5 and the ground potential (low-potential-side power supply) Vss, and each have an anode connected to the node N5 and a cathode connected to the ground potential (low-potential-side power supply) Vss.

The MOS transistor PMT3 is a P-channel MOS transistor. The MOS transistor PMT3 has a source (a first terminal) connected to the power supply (high-potential-side power supply) VCC, a gate connected to the node N3, and a drain (a second terminal) connected to a node N6. The resistor R2 has one end connected to the node N6 and the other end connected to a node N7. The diode D3 has an anode connected to the node N7 and a cathode connected to the ground potential (low-potential-side power supply) Vss.

Here, the mirror ratios of the MOS transistor PMT2 and the MOS transistor PMT3 to the MOS transistor PMT1 are set to 1, and the mirror ratio of the MOS transistor NMT2 to the MOS transistor NMT1 is set to 1. For the mirror ratio 1, the gate lengths (Lg) of the MOS transistors are set to the same, and the values of the gate width (Wg)/the gate length (Lg) are set to the same. The sizes of the diode D1, diode D2, and diode D3 are set to the same.

Thus, defining that the current that flows from the MOS transistor PMT1 through the MOS transistor NMT1 and the diode D1 to the ground potential (low-potential-side power supply) Vss is a current Ia, the current that flows from the MOS transistor PMT2 through the MOS transistor NMT2, the resistor R1, and the diodes D2 to the ground potential (low-potential-side power supply) Vss is a current Ia, and the current that flows from the MOS transistor PMT3 through the resistor R2 and the diode D3 to the ground potential (low-potential-side power supply) Vss is a current Ia.

The voltage Vk is expressed as $$Vk=(r2/r1)\times\{(kb\cdot T)/q\times\ln(k)\} \quad \text{formula (1),}$$

where r1 is the resistance value of the resistor R1, r2 is the resistance value of the resistor R2, kb is the Boltzmann constant, q is the amount of electric charge, T is the absolute temperature, and k is a constant. Thus, voltage Vk has a positive temperature coefficient.

The current source circuit 4 is provided between the voltage source circuit 3 and the photodiode PD1. The current source circuit 4 generates a current Iadd (a first current) which is a compensation current having a positive temperature coefficient, based on the voltage Vk. The current source circuit 4 supplies the current Iadd (the first current) to the photodiode PD1.

The current source circuit 4 includes MOS transistors PMT4 and PMT5 and MOS transistors NMT3 and NMT4.

The MOS transistor PMT4 is a P-channel MOS transistor. The MOS transistor PMT4 has a source connected to the power supply (high-potential-side power supply) VCC and a drain connected to a node N8.

The MOS transistor PMT5 is a P-channel MOS transistor. The MOS transistor PMT5 has a source connected to the power supply (high-potential-side power supply) VCC, a gate connected to the gate of the MOS transistor PMT4, and a drain connected to the gate of the MOS transistor PMT5 and a node N10.

The MOS transistor NMT3 is an N-channel MOS transistor. The MOS transistor NMT3 is a diode having a drain connected to the node N8, a gate connected to the drain of the MOS transistor NMT3, and a source connected to a node N9.

The MOS transistor NMT4 is an N-channel MOS transistor. The MOS transistor NMT4 has a drain connected to the node N9, a gate to which the voltage Vk is applied, and a source connected to the ground potential (low-potential-side power supply) Vss. When the voltage Vk is applied to the gate of the MOS transistor NMT4, the MOS transistor NMT4 turns on and causes the current Iadd, which is the drain current, to flow to the ground potential (low-potential-side power supply) Vss side.

The MOS transistor NMT4 operates based on the voltage Vk having a positive temperature coefficient. The current source circuit 4 generates the current Iadd having a positive temperature coefficient and operates as a PTAT current source.

The current source circuit 4 outputs a current Iadd that mirrors the current Iadd by means of the current mirror circuit (the MOS transistor PMT4 and the MOS transistor PMT5) from the drain side of the MOS transistor PMT5 to the node N10.

The photodiode PD1 has a cathode connected to the node N10, the current source circuit 4, and the input side of the transimpedance circuit 2, and an anode connected to the ground potential (low-potential-side power supply) Vss. The photodiode PD1 receives an optical signal and generates a current signal by photoelectrically converting the optical signal. The optical signal is a signal generated by a light emitting diode (LED) on the transmission side, for example. The photodiode PD1 employs a silicon positive-intrinsic-negative (PIN) diode, but may employ a silicon avalanche photo-diode (APD), a silicon PN diode, an InGaAs diode, a GaAs diode, or the like.

The photodiode has a photoelectric conversion characteristic having a negative temperature coefficient, and the temperature coefficient is dependent on the materials, the structure, and the like of the photodiode but independent of the applied voltage and the supply current.

In the embodiment, a voltage is applied to the photodiode PD1 in the reverse direction, and the photodiode PD1 generates a current signal Ip which is the sum of the current Iadd, the dark current (details will be described later), and the photoelectric conversion current.

In the transimpedance circuit 2, the input side is connected to the cathode of the photodiode PD1, the node N10, and the current source circuit 4. The transimpedance circuit 2 includes an amplifier circuit AMP1 and a resistor RF which is a negative feedback resistor. The transimpedance circuit 2 receives the current signal Ip, generates an output voltage Vout by current-voltage-converting the current signal Ip, and outputs the generated output voltage Vout from a node N12.

Figure 2:
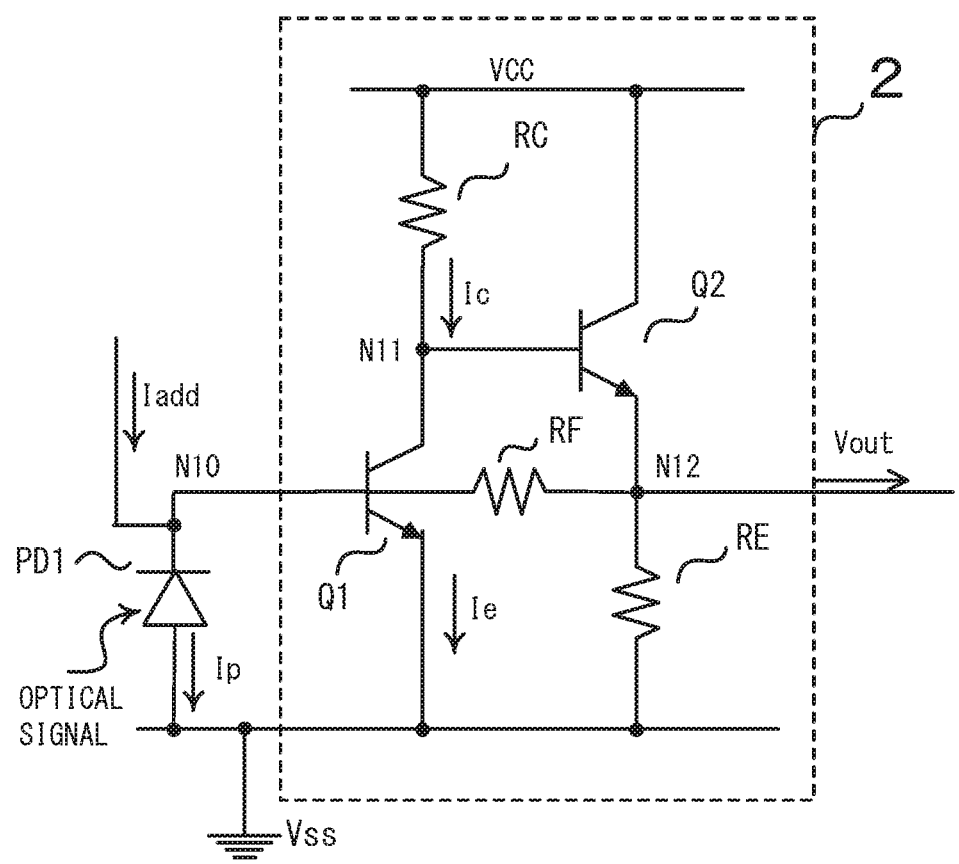
FIG. 2 is a circuit diagram showing a transimpedance circuit according to the first embodiment.

The transimpedance circuit 2, as shown in FIG. 2, includes a resistor RC, a resistor RE, the resistor RF, a bipolar transistor Q1, and a bipolar transistor Q2.

The resistor RC has one end connected to the power supply (high-potential-side power supply) VCC and the other end connected to a node N11. The bipolar transistor Q1 is an NPN transistor. The bipolar transistor Q1 has a collector connected to the node N11, a base to which the current signal Ip is inputted, and an emitter connected to the ground potential (low-potential-side power supply) Vss. The bipolar transistor Q1 generates the output voltage Vout which is the sum of the current signal Ip×the resistance value of the resistor RF and a base-emitter voltage Vbe.

The bipolar transistor Q2 is an NPN transistor used as an emitter follower. The bipolar transistor Q2 has a collector connected to the power supply (high-potential-side power supply) VCC, a base connected to the node N11, and an emitter connected to the node N12. The resistor RE has one end connected to the node N12 and the other end connected to the ground potential (low-potential-side power supply) Vss.

The resistor RF which is a negative feedback resistor has one end connected to the node N10 and the base of the bipolar transistor Q1 and the other end connected to the node N12.

Figure 3:
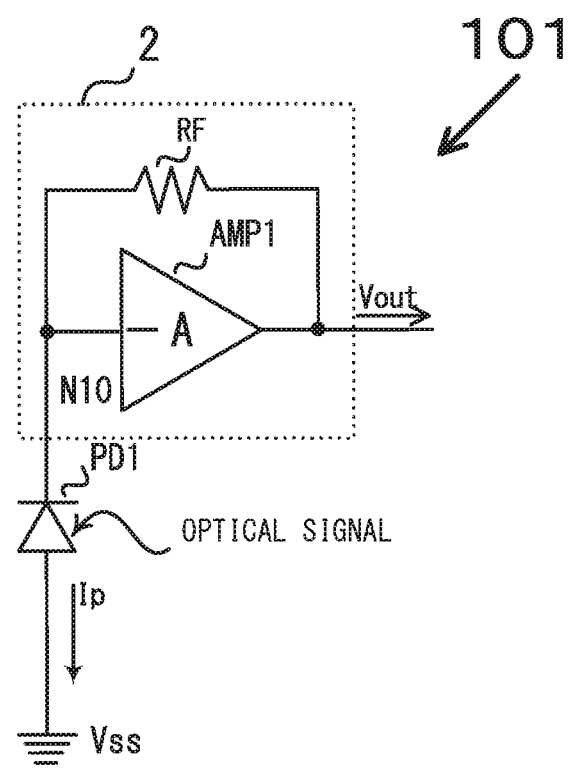
FIG. 3 is a circuit diagram showing an optical receiving circuit of a comparative example.
Figure 4:
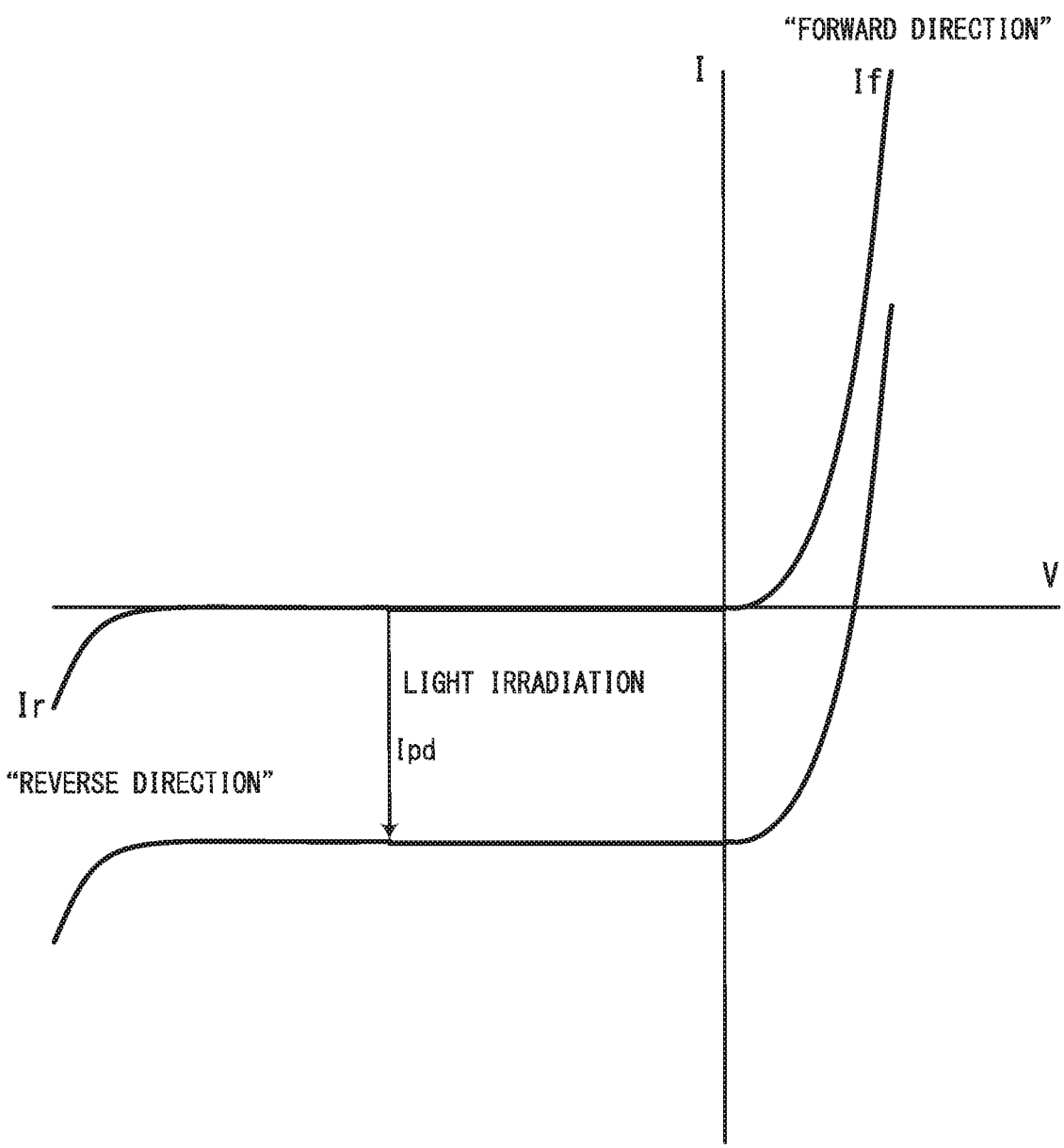
FIG. 4 is a diagram for explaining operation of a photodiode of the comparative example.
Figure 5:
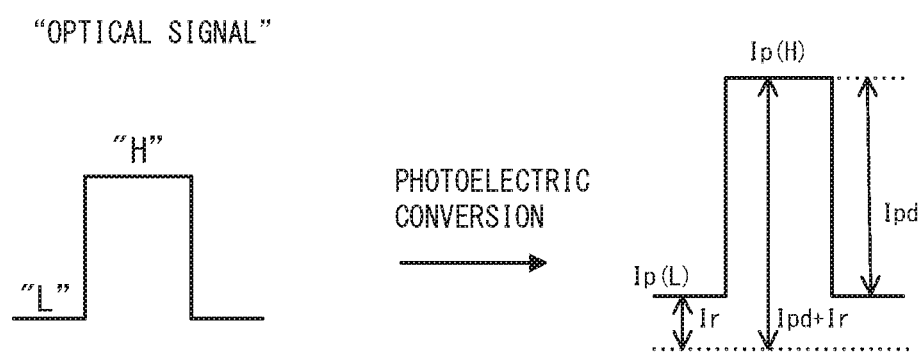
FIG. 5 is a diagram showing operation waveforms of the photodiode of the comparative example at a voltage application in the reverse direction.
Figure 6:
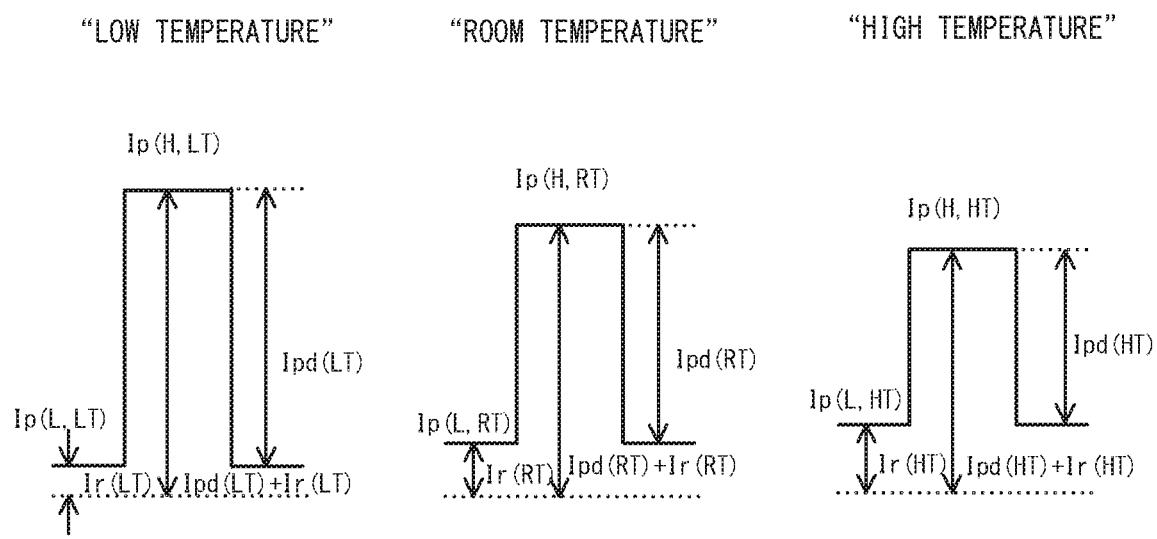
FIG. 6 is a diagram showing operation waveforms of the photodiode of the comparative example at a voltage application in the reverse direction.

Next, an optical receiving circuit of a comparative example will be described with reference to FIGS. 3 to 6. FIG. 3 is a circuit diagram showing an optical receiving circuit of a comparative example. FIG. 4 is a diagram to explain the operation of the photodiode in the comparative example. FIG. 5 is a diagram showing the operation waveforms of the photodiode of the comparative example at a voltage application in the reverse direction. FIG. 6 is a diagram showing the operation waveforms of the photodiode of the comparative example at a voltage application in the reverse direction.

As shown in FIG. 3, the optical receiving circuit 101 of the comparative example includes a transimpedance circuit 2 and a photodiode PD1. The optical receiving circuit 101 of the comparative example does not have a current compensation circuit 1 which is included in the optical receiving circuit 100 of the embodiment. The optical receiving circuit 101 of the comparative example generates a current signal Ip which is the sum of the dark current and the photoelectric conversion current.

As shown in FIG. 4, in the case where a reverse-direction voltage is applied to the photodiode PD1 of the optical receiving circuit 101 of the comparative example when there is no irradiation no optical signal), the photodiode PD1 causes a dark current Ir to flow. During light irradiation, the photodiode PD1 generates a photoelectric conversion current Ipd by photoelectric conversion. The dark current Ir is the reverse-direction saturation current of the photodiode PD1. To suppress the increase in the reverse-direction saturation current, it is preferable to set the reverse-direction application voltage to a small value. Since the dark current increases in proportion to the reverse bias and the increase in temperature, in the case where linearity is required for the optical signal at low illuminance, it is preferable to apply a smaller reverse bias. Note that in the case where a forward-direction voltage is applied when there is no irradiation (no optical signal), a dark current If flows.

As shown in FIG. 5, the photodiode PD1 of the optical receiving circuit 101 of the comparative example causes a current signal Ip(L) (=Ir) which is the low level to flow when there is no irradiation, and causes a current signal Ip(H) (=Ipd+Ir) which is the high level to flow when there is light irradiation.

As shown in FIG. 6, defining that in the photodiode PD1 of the optical receiving circuit 101 of the comparative example, Ir(LT) is a dark current at a low temperature, Ir(RT) is a dark current at room temperature, Ir(HT) is a dark current at a high temperature, Ipd(LT) is a photoelectric conversion current at the low temperature, Ipd(RT) is a photoelectric conversion current at room temperature, Ipd (HT) is a photoelectric conversion current at the high temperature, Ip(H, LT) is a current signal of the high level at the low temperature, Ip(H, RT) is a current signal of the high level at room temperature, and Ip(H, HT) is a current signal of the high level at the high temperature, $$Ir(LT) < Ir(RT) < Ir(HT) \quad \text{formula (2),}$$

$$Ipd(LT) > Ipd(RT) > Ipd(HT) \quad \text{formula (3), and}$$

$$Ipd(LT), Ipd(RT), Ipd(HT) > Ir(LT), Ir(RT), Ir(HT) \quad \text{formula (4).}$$

Thus, $$Ip(H,LT) > Ip(H,RT) > Ip(H,HT) \quad \text{formula (5).}$$

Hence, for the photodiode PD1 of the optical receiving circuit 101 of the comparative example, the current signal of the low level at the high temperature (Ip(L, HT)) (when there is no irradiation) is high, the current signal of the high level at the high temperature (Ip(H, HT) is low, and the signal amplitude and the signal level of the high level of the current signal. Ip at the high temperature are low, as compared to those at room temperature.

The transfer function of the output voltage Vout corresponding to the current signal Ip which is the input signal of the transimpedance circuit 2 is expressed as $$Vout/Ip = Rf/\{1 + (1/(Aol(jw) \times \beta))\} \quad \text{formula (6),}$$

Here, Aol(jw) is the frequency characteristic of the open loop gain of the transimpedance circuit, ß is the feedback ratio, and Rf is the resistance value of a negative feedback resistor 11W.

Here, in the case that $Aol(jw) \times \beta \gg 1$, $$Vout = Ip \times Rf \quad \text{formula (7).}$$

Hence, in the case where the high-level signal level of the current signal Ip of the photodiode PD1 decreases at high temperature, characteristics such as transmission delay time, input sensitivity, and the like decrease. At a high temperature, the photoelectric conversion current Ipd in the current signal Ip of the photodiode PD1 decreases. Thus, error voltage components in the output voltage Vout other than the photoelectric conversion component increase, and this makes the gain lower than that at room temperature.

In the embodiment, the current Iadd having a positive temperature coefficient is supplied to the photodiode Pal by using the current compensation circuit 1, and this compensates for a decrease in the high-level signal level of the current signal Ip of the photodiode PD1 that occurs at a high temperature.

Figure 7:
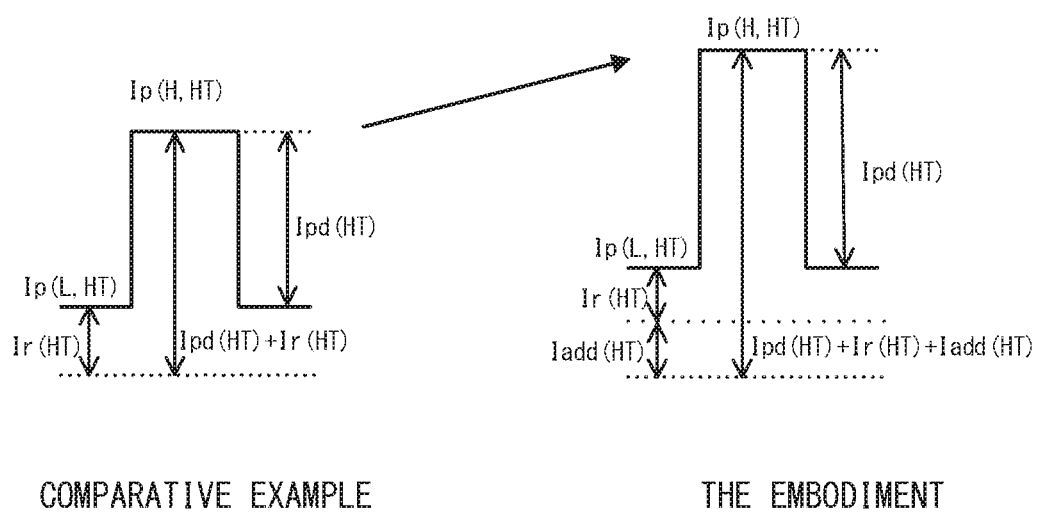
FIG. 7 is a comparison diagram showing operation waveforms of the photodiode of the first embodiment and the photodiode of the comparative example at high temperature.

The operation waveform of the photodiode of the optical receiving circuit in the embodiment will be described with reference to FIG. 7. FIG. 7 is a comparison diagram showing the operation waveforms of a photodiode of the embodiment and a photodiode of the comparative example at a high temperature. Here, Iadd(LT) is a current Iadd at a low temperature, Iadd(RT) is a current Iadd at room temperature, and Iadd(HT) is a current Iadd at a high temperature.

As shown in FIG. 7, in the case where the optical receiving circuit 100 and surrounding circuits are at a high temperature, the current signal Ip(L,HT) of the low level at the high temperature is Ir(HT)+Iadd(HT), and the current signal Ip(H, HT) of the high level at the high temperature is Ipd(HT)+Ir(HT)+Iadd(HT).

Here, the current Iadd is expressed as $$Iadd(LT) < Iadd(RT) < Iadd(HT) \quad \text{formula (8).}$$

By setting as follows, $$Iadd(HT) > Ir(HT) \quad \text{formula (9)},$$

the following relationship can be achieved, $$Ipd(HT) + Ir(HT) + Iadd(HT) \geq Ipd(RT) + Ir(RT) \quad \text{formula (10)}.$$

This thus compensates for a decrease in the high-level signal level of the current signal Ip of the photodiode PD1 that occurs at high temperature.

Although in the embodiment, a current mirror circuit is used for the current source circuit 4, the invention is not limited to the above case. A current source circuit 4a of a first modification shown in FIG. 9 or a current source circuit 4b of a second modification shown in FIG. 10, for example, may be used instead of the current source circuit 4.

Figure 9:
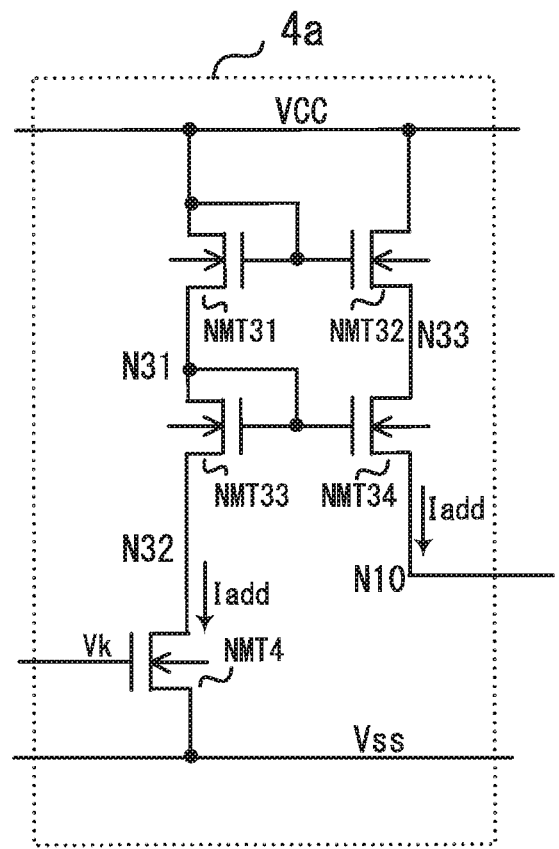
FIG. 9 is a circuit diagram showing a current source circuit of a first modification.

As shown in FIG. 9, the current source circuit 4a of the first modification includes MOS transistors NMT31 to NMT34 and a MOS transistor NMT4. The current source circuit 4a employs a cascade current mirror circuit including the MOS transistors NMT31 to NMT34.

The MOS transistor NMT31 is an N-channel MOS transistor. The MOS transistor NMT31 has a drain connected to a power supply (high-potential-side power supply) VCC and the gate of the MOS transistor NMT31, and a source connected to a node N31. The MOS transistor NMT33 is an N-channel MOS transistor. The MOS transistor NMT33 has a drain connected to the node N31 and the gate of the MOS transistor NMT33, and a source connected to a node N32. The MOS transistor NMT4 has a drain connected to the node N32, a gate to which the voltage Vk is applied, and a source connected to a ground potential (low-potential-side power supply) Vss.

The MOS transistor NMT32 is an N-channel MOS transistor. The MOS transistor NMT32 has a drain connected to the power supply (high-potential-side power supply) VCC, a gate connected to the gate of the MOS transistor NMT31, and a source connected to a node N33. The MOS transistor NMT34 is an N-channel MOS transistor. The MOS transistor NMT34 has a drain connected to the node N33, a gate connected to the gate of the MOS transistor NMT33, and a source connected to a node N10.

The current source circuit 4a flows, from the node N10 side, a current Iadd that mirrors the current Iadd that flows through the MOS transistor NMT4 and has a positive temperature coefficient.

Figure 10:
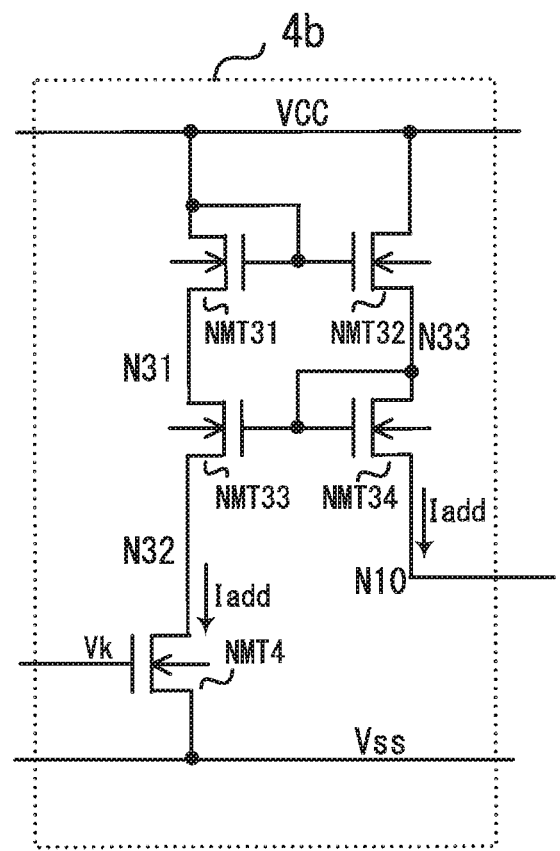
FIG. 10 is a circuit diagram showing a current source circuit of a second modification.

As shown in FIG. 10, the current source circuit 4b of the second modification includes MOS transistors NMT31 to NMT34 and a MOS transistor NMT4. The current source circuit 4b employs a Wilson current mirror circuit including the MOS transistors NMT31 to NMT34.

The MOS transistor NMT31 is an N-channel MOS transistor. The MOS transistor NMT31 has a drain connected to a power supply (high-potential-side power supply) VCC and the gate of the MOS transistor NMT31, and a source connected to a node N31. The MOS transistor NMT33 is an N-channel MOS transistor. The MOS transistor NMT33 has a drain connected to the node N31 and a source connected to a node N32. The MOS transistor NMT4 has a drain connected to the node N32, a gate to which the voltage Vk is applied, and a source connected to a ground potential (low-potential-side power supply) Vss.

The MOS transistor NMT32 is an N-channel MOS transistor. The MOS transistor NMT32 has a drain connected to the power supply (high-potential-side power supply) VCC, a gate connected to the gate of the MOS transistor NMT31, and a source connected to a node N33. The MOS transistor NMT34 is an N-channel MOS transistor. The MOS transistor NMT34 has a drain connected to the node 33 and the gate of the MOS transistor NMT34, the gate connected to the gate of the MOS transistor NMT33, and a source connected to a node N10.

The mirror ratio of the MOS transistor NMT32 to the MOS transistor NMT31 is 1, and the mirror ratio of the MOS transistor NMT34 to the MOS transistor NMT33 is 1. The current source circuit 4b provides, from the node N10 side, a current Iadd that mirrors the current Iadd that flows through the MOS transistor NMT4 and has a positive temperature coefficient.

Note that in the specification, the signal that the photodiode generates and outputs is referred to mainly as a current signal, and the signal that other circuits, the current compensation circuit, the voltage source circuit, the current source circuit, or the like generates and outputs is referred to mainly as a current. However, in the case where definition is clear, such distinction is omitted for some of a dark current, a photoelectric conversion current, and the like for simplification of explanation. To define these signal, other terms (terms unified with the first current, the second current, the third current, and others, for example) may be used for the definition.

As described above, the optical receiving circuit of the embodiment includes the current compensation circuit 1, the transimpedance circuit 2, and the photodiode PD1. The current compensation circuit 1 includes the voltage source circuit 3 and the current source circuit 4. The photodiode PD1 has a cathode connected to the node N10, the current source circuit 4, and the input side of the transimpedance circuit 2, and an anode connected to the ground potential (low-potential-side power supply) Vss. The photodiode PD1 generates the photoelectric conversion current Ipd having a negative temperature coefficient. The current compensation circuit 1 supplies the current Iadd having a positive temperature coefficient to the photodiode PD1. At a high temperature, the photodiode PD1 generates Ipd(HT)+Ir(HT)+Iadd(HT) as the high-level current signal Ip(H, HT) and outputs it to the transimpedance circuit 2.

This operation compensates for a decrease in the high-level signal level of the current signal Ip of the photodiode PD1 that occurs at a high temperature, and this enables the optical receiving circuit 100 to perform stable optical receiving operation from the low temperature range to the high temperature range.

Note that in the first embodiment, N-channel MOS transistors may be used instead of the MOS transistors PMT4 and PMT5 included in the current mirror circuit.

Figure 8:
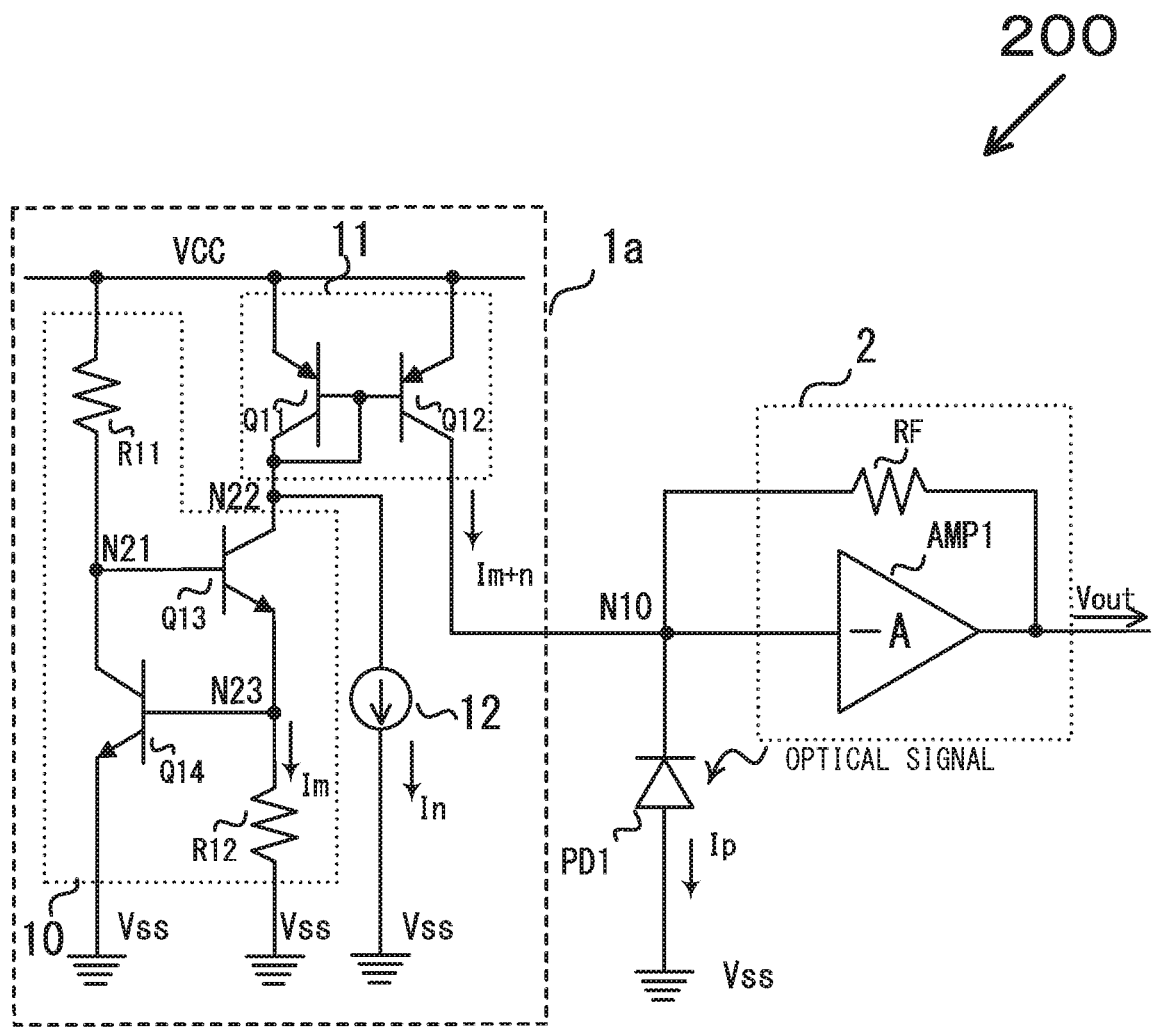
FIG. 8 is a circuit diagram showing an optical receiving circuit according to a second embodiment.

An optical receiving circuit according to a second embodiment will be described with reference to drawings. FIG. 8 is a circuit diagram showing an optical receiving circuit.

In the second embodiment, the optical receiving circuit has a current compensation circuit to compensate for a decrease in the current signal caused by a decrease in the photoelectric conversion efficiency of the photodiode that occurs in high temperature operation.

In the following, the same portions as in the first embodiment are denoted by the same symbols, description for the same portions is omitted, and only different portions are described.

As shown in FIG. 8, the optical receiving circuit 200 includes a current compensation circuit 1a, a transimpedance circuit 2, and a photodiode PD1. The optical receiving circuit 200 is one applied to optical communication, but may be applied to medical diagnosis, information processing, camera exposure control, fax, laser alignment, bar codes, and the like.

The current compensation circuit 1a includes a current limiting circuit 10, a current mirror circuit 11, and a current source 12. The current compensation circuit 1a generates a current to compensate for a decrease in the current signal Ip caused by a decrease in the photoelectric conversion current of the photodiode PD1 in high temperature operation and supplies the generated current to the photodiode PD1.

The current limiting circuit 10 includes bipolar transistors Q13 and Q14 and resistors R11 and R12.

The resistor R11 has one end connected to a power supply (high-potential-side power supply) VCC and the other end connected to a node N21. The bipolar transistor Q14 is an NPN transistor. The bipolar transistor Q14 has a collector (first terminal) connected to the node N21, a base (control terminal) connected to a node N23, and an emitter (second terminal) connected to a ground potential (low-potential-side power supply) Vss. The bipolar transistor Q13 is an NPN transistor. The bipolar transistor Q13 has a collector (first terminal) connected to a node N22 (current mirror circuit 11), a base (control terminal) connected to the node N21, and an emitter (second terminal) connected to the node N23. The resistor R12 has one end connected to the node N23 and the other end connected to the ground potential (low-potential-side power supply) Vss.

In the current limiting circuit 10, the current flowing on the emitter side of the bipolar transistor Q13 is applied to the base of the bipolar transistor Q14 while a voltage drop occurs at the resistor R12. When the base-emitter path of the bipolar transistor Q14 turns on, the base-emitter path of the bipolar transistor Q13 also turns on, and a current that is originally to flow into the base of the bipolar transistor Q13 is taken by the bipolar transistor Q14. Thus, the current Im that flows through the bipolar transistor Q13 cannot exceed 0.6V/the resistance value of the resistor R12.

Defining that r12 is the resistance value of the resistor R12, Im is the current that flows through the resistor R12, VT is the thermal voltage, Is is the saturation current, Ie is the emitter current, Ic is the collector current, kb is the Boltzmann constant, T is the absolute temperature, Vbe is the base-emitter voltage, and q is the amount of electric charge, Vbe, VT, and Im are expressed as $Vbe = VT \times \ln(Ie/Is)$   formula (11), $VT = (kb \times T)/q$   formula (12), and $Im (=Ic) \approx Is \times \exp(Vbe/VT)$   formula (13).

Thus, the base-emitter voltage Vbe of the bipolar transistor Q13 has a positive temperature coefficient, and the current Im flowing through the resistor R12 has a positive temperature coefficient.

The current source 12 is provided between the node N22 (the current mirror circuit 11) and the ground potential (low-potential-side power supply) Vss and provides a constant current in to the ground potential (low-potential-side power supply) Vss. Thus, the current that flows through the node N22 is a current Im+n which is the sum current of the current In and the current Im having a positive temperature coefficient.

The current mirror circuit 11 includes bipolar transistors Q11 and Q12, and outputs a current that mirrors current Im+n to the photodiode PD1 via a node N10.

The bipolar transistor Q11 is a PNP transistor. The bipolar transistor Q11 has an emitter (first terminal) connected to the power supply (high-potential-side power supply) VCC, and a base (control terminal) connected to the collector (second terminal) of the bipolar transistor Q11 and the node N22. The bipolar transistor Q12 is a PNP transistor. The bipolar transistor Q12 has an emitter (first terminal) connected to the power supply (high-potential-side power supply) VCC, a base (control terminal) connected to the base of the bipolar transistor Q11, and a collector connected to the node N10, and outputs current Im+n from the collector side.

Here, the current mirror circuit 11 is constituted of bipolar transistors, but the invention is not limited to the above case. For example, a current mirror circuit constituted of two MOS transistors, a Wilson current mirror circuit constituted of MOS transistors, a cascode current mirror circuit constituted of MOS transistors, or the like may be used instead.

The photodiode PD1 has a cathode connected to the output side of the current compensation circuit Ia (node N10) and the input side of the transimpedance circuit 2, and an anode connected to the ground potential (low-potential-side power supply) Vss. A voltage is applied to the photodiode PD1 in the reverse direction, and the photodiode PD1 generates a current signal Ip which is the sum of the dark current, the photoelectric conversion current, and the current Im+n which is the sum current of the current In and the current Im having a positive temperature coefficient.

In the embodiment, the current Im having a positive temperature coefficient is used to compensates for a decrease in the high-level signal level of the current signal Ip of the photodiode PD1 that occurs in high temperature operation. Note that details of the compensation are the same as those of the first embodiment, description of the details is omitted.

As described above, the optical receiving circuit of the embodiment includes the current compensation circuit Ia, the transimpedance circuit 2, and the photodiode PD1. The current compensation circuit Ia includes the current limiting circuit 10, the current mirror circuit 11, and the current source 12. The current limiting circuit 10 includes the bipolar transistors Q13 and Q14 and the resistors R11 and R12 and supplies the current Im+n, which is the sum current of the current In and the current Im having a positive temperature coefficient, to the photodiode PD1. A voltage is applied to the photodiode PD1 in the reverse direction, and the photodiode PD1 generates the current signal Ip which is the sum of the current Im+n, the dark current, and the photoelectric conversion current, and outputs the generated current to the transimpedance circuit 2.

Thus, it is possible to compensate for the high-level signal level of the photodiode PD1 at a high temperature, and this enables the optical receiving circuit 200 to perform stable optical receiving operation from the low temperature range to the high temperature range.

Although the first embodiment and the first and second modifications employ a current compensation circuit including MOS transistors, the invention is not limited to the above cases. The current compensation circuit may be constituted of bipolar transistors or may be constituted of a BiCMOS circuit.

While certain embodiments have been described, these embodiments have been presented by way of example only, and are not intend to limit the scope of the inventions. Indeed, the novel embodiments described herein may be embodied in a variety of the other forms; furthermore, various omissions, substitutions and changes in the form of the embodiments described herein may be made without departing from the spirit of the inventions. The accompa-

What is claimed is:

1. An optical receiving circuit comprising:
a current compensation circuit configured to generate a first current having a positive temperature coefficient;
a photodiode configured to receive an optical signal, generate a first current signal including a photoelectric conversion current having a negative temperature coefficient, and output a second current signal that is the sum of the first current and the first current signal; and
a transimpedance circuit having a negative feedback resistor and configured to receive the second current signal and generate an output voltage by current-voltage-converting the second current signal, wherein
the current compensation circuit comprises
a voltage source circuit configured to generate a reference voltage having a positive temperature coefficient and
a current source circuit including
a first transistor configured to receive the reference voltage at a control terminal and to generate a current based on the reference voltage and
a current mirror circuit configured to mirror the current generated at the first transistor and output the first current that is a mirrored current, to the photodiode.

2. The optical receiving circuit according to claim 1, wherein
the voltage source circuit comprises
a first current mirror circuit connected to a power supply,
a second current mirror circuit connected to the first current mirror circuit,
a diode having one end connected to the second current mirror circuit and the other end connected to a ground potential, and
a second transistor having a control terminal connected to the first and second current mirror circuits and having a first terminal connected to the power supply and a second terminal connected to a first resistor,
the voltage source circuit uses a voltage generated at the second terminal of the second transistor as a reference voltage and generates the reference voltage having the positive temperature coefficient.

3. The optical receiving circuit according to claim 1, wherein
the voltage source circuit generates a proportional-to-absolute-temperature (PTAT) current.

4. The optical receiving circuit according to claim 1, wherein
the current mirror circuit is one of a current mirror circuit including two transistors, a Wilson current mirror circuit, and a cascode current mirror circuit.

5. The optical receiving circuit according to claim 1, wherein
the current mirror circuit includes a MOS transistor, a bipolar transistor, or a BiCMOS circuit.

6. An optical receiving circuit comprising:
a current compensation circuit configured to generate a first current having a positive temperature coefficient;
a photodiode configured to receive an optical signal, generate a first current signal including a photoelectric conversion current having a negative temperature coefficient, and output a second current signal that is the sum of the first current and the first current signal; and
a transimpedance circuit having a negative feedback resistor and configured to receive the second current signal and generate an output voltage by current-voltage-converting the second current signal, wherein
the current compensation circuit comprises
a current limiting circuit configured to generate a second current having a positive temperature coefficient,
a current source configured to generate a third current, and
a current mirror circuit configured to mirror a sum-current of the second current and the third current and output the first current that is a mirrored current, to the photodiode.

7. The optical receiving circuit according to claim 6, wherein
the current limiting circuit comprises
a first resistor having one end connected to a power supply,
a first transistor having a control terminal connected to the other end of the first resistor and a first terminal connected to the current mirror circuit,
a second transistor having a first terminal connected to the control terminal of the first transistor, a control terminal connected to a second terminal of the first transistor, and a second terminal connected to a ground potential, and
a second resistor having one end connected to the second terminal of the first transistor and the other end connected to the ground potential and configured to flow the second current to the ground potential side.

8. The optical receiving circuit according to claim 7, wherein
the current source has one end connected to the first terminal of the first transistor and the other end connected to the ground potential.

9. The optical receiving circuit according to claim 7, wherein
the first and second transistors are bipolar transistors.

10. The optical receiving circuit according to claim 6, wherein
the current mirror circuit is one of a current mirror circuit including two transistors, a Wilson current mirror circuit, and a cascode current mirror circuit.

11. The optical receiving circuit according to claim 6, wherein
the current mirror circuit includes a MOS transistor, a bipolar transistor, or a BiCMOS circuit.

* * * * *